US006393903B1

(12) United States Patent
Reed et al.

(10) Patent No.: US 6,393,903 B1
(45) Date of Patent: May 28, 2002

(54) VOLUMETRIC EFFICIENCY COMPENSATION FOR DUAL INDEPENDENT CONTINUOUSLY VARIABLE CAM PHASING

(75) Inventors: Dennis C. Reed, Northville; Peter James Maloney, New Hudson; Jeffrey M. Pfeiffer, Walled Lake, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/732,656

(22) Filed: Nov. 30, 2000

Related U.S. Application Data

(60) Provisional application No. 60/170,183, filed on Dec. 10, 1999.

(51) Int. Cl.[7] .................... G01M 15/00

(52) U.S. Cl. .................... 73/116; 73/117.3

(58) Field of Search .................... 73/116, 117.2, 73/117.3, 118.1, 118.2; 701/101

(56) References Cited

U.S. PATENT DOCUMENTS

| | | | | | |
|---|---|---|---|---|---|
| 5,357,932 | A | * | 10/1994 | Clinton et al. | |
| 5,522,365 | A | | 6/1996 | Milunas et al. | 123/480 |
| 5,590,632 | A | * | 1/1997 | Kato et al. | 73/117.3 |
| 5,714,683 | A | | 2/1998 | Maloney | 73/118.2 |
| 5,715,780 | A | * | 2/1998 | Haller | 73/117.3 |
| 5,753,805 | A | * | 5/1998 | Maloney | 73/118.2 |
| 6,094,974 | A | * | 8/2000 | Yamagishi et al. | 73/117.3 |
| 6,161,511 | A | * | 12/2000 | Hashimoto | |
| 6,170,446 | B1 | * | 1/2001 | Hashimoto | |
| 6,196,173 | B1 | * | 3/2001 | Takahashi et al. | |
| 6,230,675 | B1 | * | 5/2001 | Kobayashi et al. | |

* cited by examiner

*Primary Examiner*—Eric S. McCall
(74) *Attorney, Agent, or Firm*—Vincent A. Cichosz

(57) ABSTRACT

A method of estimating the volumetric efficiency of an internal combustion engine having independent intake and exhaust cam phase variation, compensates a nominal or base estimate of the volumetric efficiency in two successive stages: an intake stage, and an exhaust stage. The intake stage compensates for the effects of intake cam variation, using the base volumetric efficiency estimate as a starting point; and the exhaust stage compensates for the effects of exhaust cam variation, using the output of the intake stage as a starting point. The volumetric efficiency so compensated is then used to accurately compute the mass intake airflow for engine control purposes.

7 Claims, 2 Drawing Sheets

VOLUMETRIC EFFICIENCY COMPENSATION FOR DUAL INDEPENDENT CONTINUOUSLY VARIABLE CAM PHASING

This application claims benefit of Provisional Appln. No. 60/170,183 filed Dec. 10, 1999.

TECHNICAL FIELD

This invention relates to the control of an internal combustion engine having intake and exhaust camshafts that are independently and continuously variable, and more particularly to a method of estimating the volumetric efficiency of the engine for purposes of engine fuel control.

BACKGROUND OF THE INVENTION

Accurate control of engine air/fuel ratio requires knowledge of the mass air flow entering the engine cylinders in each combustion cycle. Ordinarily, this can be accurately determined through a speed-density calculation based on the measured engine speed (ES) and intake manifold temperature (MAT) and absolute pressure (MAP), taking into account various factors including the volumetric efficiency of the engine. The volumetric efficiency, in turn, can be estimated based on engine speed ES and a pressure ratio (PR) between the intake and exhaust manifolds of the engine; see, for example, the U.S. Pat. No. 5,714,683, issued on Feb. 3, 1998, and incorporated herein by reference.

The above-described process must be adjusted for engines equipped with cam phasing mechanisms because varying the phase of an intake or exhaust camshaft (relative to the crankshaft) changes the breathing characteristics, and therefore the volumetric efficiency, of the engine. In the above-mentioned U.S. Pat. No. 5,714,683, this is achieved in the case of single or dual-equal cam phasing by computing a cam-phase compensated mass airflow as a function of the cam phase angle using a second-order equation to approximate a nominal mass airflow vs. cam phase relationship, and then adjusting the nominal mass airflow for pressure and temperature effects. In that approach, the coefficients of the second-order equation are determined by table-look-up based on engine speed ES and the pressure ratio PR, with the table values being determined by bench calibration for various combinations of cam phase angle, engine speed ES and pressure ratio PR. Theoretically, a similar approach could be used to determine volumetric efficiency, from which mass airflow could be computed as mentioned in the preceding paragraph. However, such an approach becomes highly impractical for engines having independently controlled variable intake and exhaust cam phasing mechanisms since the number of required look-up tables (and consequently, the required calibration effort) increases dramatically. Accordingly, what is needed is a more practical and efficient method of accurately estimating the volumetric efficiency of an engine having dual independent cam phase variation.

SUMMARY OF THE INVENTION

The present invention is directed to an improved method of estimating the volumetric efficiency of an internal combustion engine having independent intake and exhaust cam phase variation, the method providing a significant reduction in stored data requirements and calibration effort, compared to known methods. According to the invention, the effects of intake and exhaust cam phase variation are de-coupled, and a nominal or base estimate of the volumetric efficiency is compensated for dual cam phase variation in a process involving two successive stages: an intake stage, and an exhaust stage. The intake stage compensates for the effects of intake cam variation, using the base volumetric efficiency estimate as a starting point; and the exhaust stage compensates for the effects of exhaust cam variation, using the output of the intake stage as a starting point. The volumetric efficiency so compensated is then used to accurately compute the mass intake airflow for engine control purposes.

DESCRIPTION OF THE PREFERRED EMBODIMENT

Figure 1:
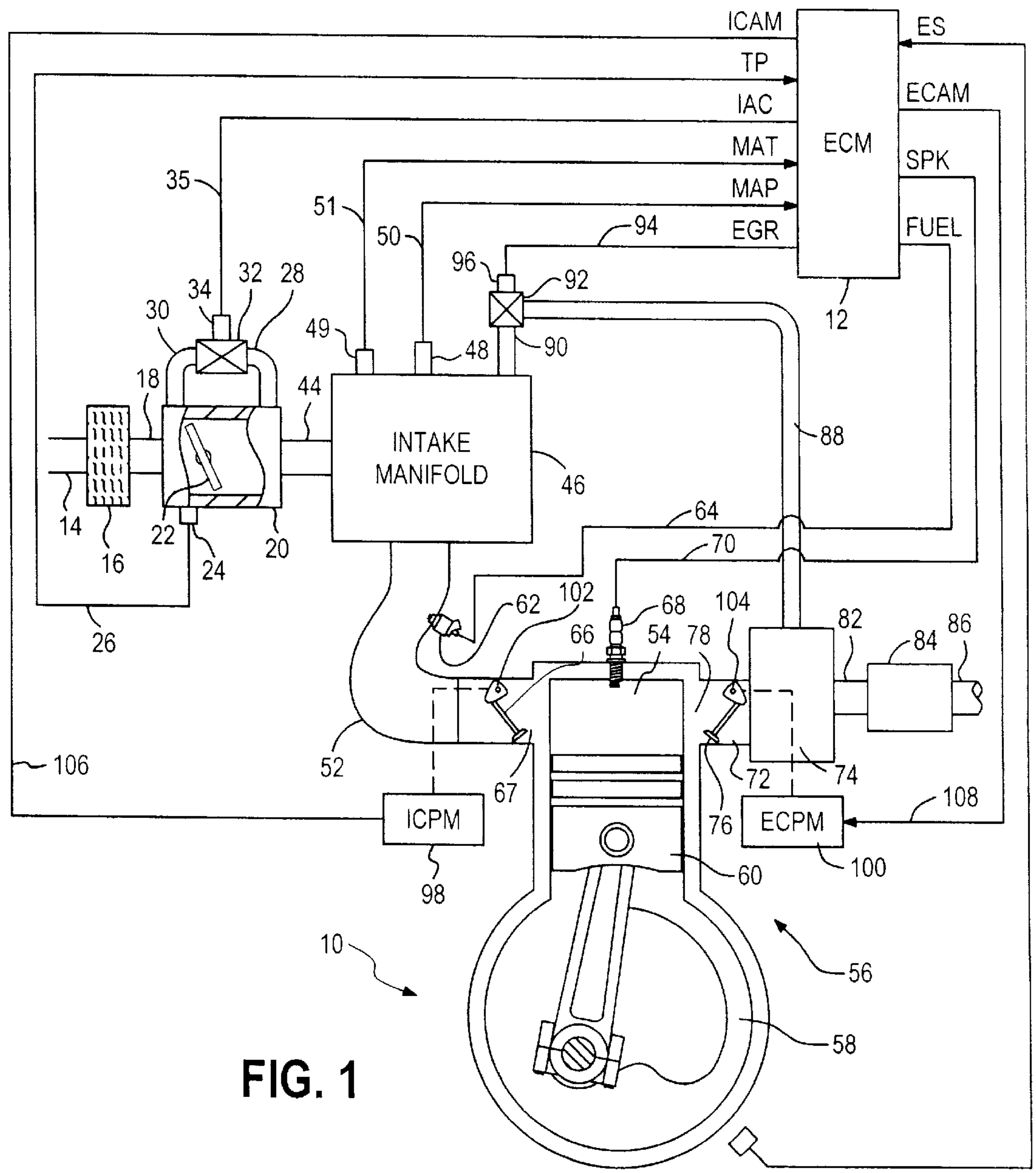
FIG. 1 is a schematic diagram of an internal combustion engine having independent intake and exhaust cam phase mechanisms and a microprocessor-based engine control unit programmed for carrying out the control of this invention.

Referring to the drawings, and particularly to FIG. 1, the reference numeral 10 generally designates a four-stroke internal combustion engine controlled by a microprocessor-based engine control module (ECM) 12. Inlet air at atmospheric pressure passes through fresh air inlet 14, air cleaner 16 and intake duct 18 into throttle body 20. A throttle plate 22 rotatably disposed in the throttle body 20 is manually or electronically positioned to vary restriction to the inlet air. The position of throttle plate 22 is detected by the sensor 24, which provides a throttle position signal (TP) to ECM 12 on line 26. A portion of inlet air is routed past throttle plate 22 through conduits 28 and 30 and a conventional idle air bypass valve 32. The bypass valve 32 is positioned by a stepper motor 34, and the ECM 12 supplies an idle air control (IAC) signal on line 35 to stepper motor 34 during engine idle for purposes of maintaining a desired engine idle speed. Airflow out of throttle body 20 is coupled through intake duct 44 into the intake manifold plenum volume 46 (referred to hereinafter simply as the intake manifold). Conventional pressure and temperature transducers 48 and 49 are exposed to gas pressure in the intake manifold 46 and provide manifold absolute pressure and temperature signals (IMAP, IMAT) to ECM 12 via lines 50 and 51, respectively. Individual cylinder intake runners 52 couple intake manifold 46 to the combustion chambers 54 of respective engine cylinders 56, only one cylinder 56 being shown in FIG. 1. Each combustion chamber 54 is separated from the engine crankcase 58 by a respective piston 60 which engages the inside wall of the respective cylinder. A quantity of fuel is injected via conventional fuel injector 62 in response to a fuel injection command signal (FUEL) from ECM 12 on line 64. In the illustrated embodiment, the fuel mixes with the inlet air and is drawn into the combustion chamber 54 during an intake event when a cam-operated intake valve 66 opens an intake port 67. The air-fuel mixture is ignited in the combustion chamber 54 during a combustion event initiated by a timed spark across the spaced electrodes of spark plug 68, which is controlled by ECM 12 via a spark control signal (SPK) line 70. Gasses produced during the combustion event are exhausted through exhaust runner 72 to exhaust manifold 74 during an exhaust event when a cam-operated exhaust valve 76 opens an exhaust port 78. The exhaust gasses pass through the exhaust manifold 74 to an exhaust duct 82 leading to catalytic converter 84 and tailpipe 86. A portion of the exhaust gasses are drawn from exhaust manifold 74 through conduits 88, 90 and exhaust gas recirculation (EGR) valve 92 into the intake manifold 46 for mixing with inlet air for delivery to the cylinder combustion chambers 54. The ECM 12 issues an EGR control signal (EGR) on line 94 for positioning the EGR valve 92 with solenoid or stepper motor 96 to vary the dilution of the fresh inlet air with exhaust gasses for improved emission control and fuel economy.

The engine 10 is additionally equipped with intake and exhaust variable cam phase mechanisms 98 and 100 coupled to intake and exhaust camshafts 102, 104 for independently varying the phase or timing of the intake and exhaust valves 66, 76 relative to the base camshaft timing. The ECM 12 issues intake and exhaust cam phase control signals ICAM, ECAM to cam phase mechanisms 98 and 100 via lines 106 and 108, respectively, for achieving exhaust gas emission reduction and engine performance improvement. In general, the exhaust cam phase is varied to control charge dilution due to reingestion of exhaust gases (possibly enabling elimination of EGR valve 92), and the intake cam phase is varied to help optimize the engine output torque profile. Alternatively, intake and exhaust valve phase variation may be effectively achieved with direct electro-hydraulic valve actuation in so-called cam-less engines.

As indicated above, accurate control of the engine air/fuel ratio requires an accurate estimation of the mass airflow entering the engine combustion chambers 54 in each combustion cycle. To this end, the so-called speed-density method has been used to accurately compute the mass airflow (MAF) based on the measured engine speed (ES) and intake manifold temperature (IMAT) and absolute pressure (IMAP), and the engine volumetric efficiency VE as follows:

$$MAF=(IMAP*Vd*ES*VE)/(2*R*IMAT) \quad (1)$$

where Vd is the combustion chamber volume and R is a gas constant. The volumetric efficiency, defined as the ratio of the air volume ingested into the combustion chambers 54 to the swept volume of the pistons 60, can be estimated based on engine speed ES and a ratio (PR) of the intake manifold pressure IMAP to the exhaust manifold absolute pressure (EMAP), as follows:

$$VE=A+(B*PR) \quad (2)$$

where the coefficients A and B are empirically determined functions of engine speed ES for a given cam phasing. In the illustrated embodiment, the volumetric efficiency is simply determined by table-look up as a combined function of engine speed ES and pressure ratio PR, and is referred to herein as the nominal or base volumetric efficiency VEbase. Of course, the actual volumetric efficiency deviates from VEbase when the intake and/or exhaust cam phase is varied, as mentioned above. Although the table-look-up approach could theoretically be extended to account for the cam phase variation, it is impractical to do so, particularly in applications as depicted in FIG. 1 where the intake and exhaust cam phase relationships are independently varied. Even if the volumetric efficiency vs. cam phase relationship were approximated as a second or third order equation, the coefficients of the equation would have to be determined empirically, requiring numerous look-up tables to account for the various possible combinations of intake and exhaust cam phase.

The method of the present invention overcomes the above-described problems by de-coupling the effects of intake cam and exhaust cam phase variation, and compensating the base volumetric efficiency VEbase in two successive stages, one stage compensating for intake cam phase variation, and the other stage compensating for exhaust cam phase variation. With this approach, the number of required look-up tables, along with the corresponding memory requirements and calibration effort, is dramatically reduced. According to the invention, the volumetric efficiency vs. cam phase relationship is approximated as a non-linear second order equation of the form:

$$VE(x)=a_0-(a_1*x)-(a_2*x^2) \quad (3)$$

where x is the intake or exhaust cam phase angle, the coefficient ao represents an initial volumetric efficiency, and the coefficients $a_1$ and $a_2$ are empirically determined based on engine speed ES and the pressure ratio PR. In a preferred embodiment of the invention, the first stage (also referred to herein as the intake stage) uses the base volumetric efficiency VEbase as an initial value ($a_0$) and compensates for the effects of intake cam variation, while the second stage (also referred to herein as the exhaust stage) uses the output of the intake stage as an initial value, and compensates for the effects of exhaust cam variation.

Figure 2:
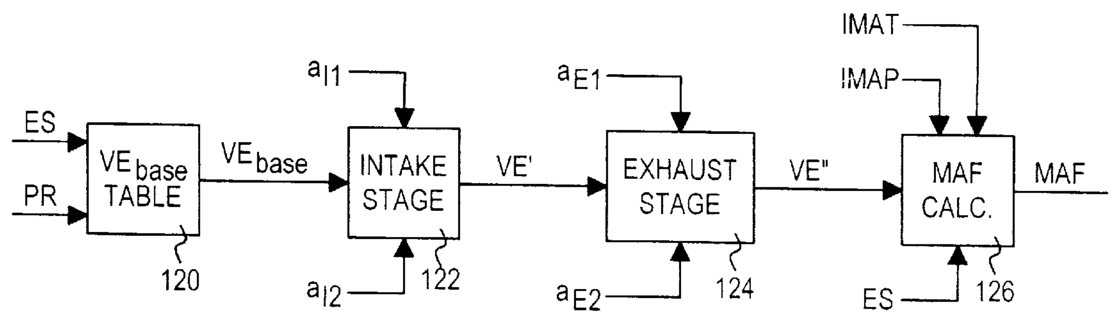
FIG. 2 is a high level block diagram illustrating a method carried out by the engine control unit of FIG. 1 according to this invention.

The block diagram of FIG. 2 generally illustrates the above approach, where block 120, 122 and 124 respectively designate a look-up table for VEbase, the first or intake stage, and the second or exhaust stage. As indicated, the table 120 determines a value for VEbase as a function of engine speed ES and pressure ratio PR, the intake stage 122 produces a modified volumetric efficiency VE' based on VEbase and the intake coefficients all and $a_{12}$, and the exhaust stage 124 produces a further modified volumetric efficiency VE" based on VE' and the exhaust coefficients $a_{E1}$ and $a_{E2}$. Finally, the mass air flow (MAF) calculation block 126 produces the intake mass airflow MAF based on VE", IMAT, IMAP and ES, using VE" for the volumetric efficiency term in equation (1) above. The ECM 12 then uses the MAF value, among other factors, to determine the fuel control signal FUEL applied to injectors 62.

Figure 3:
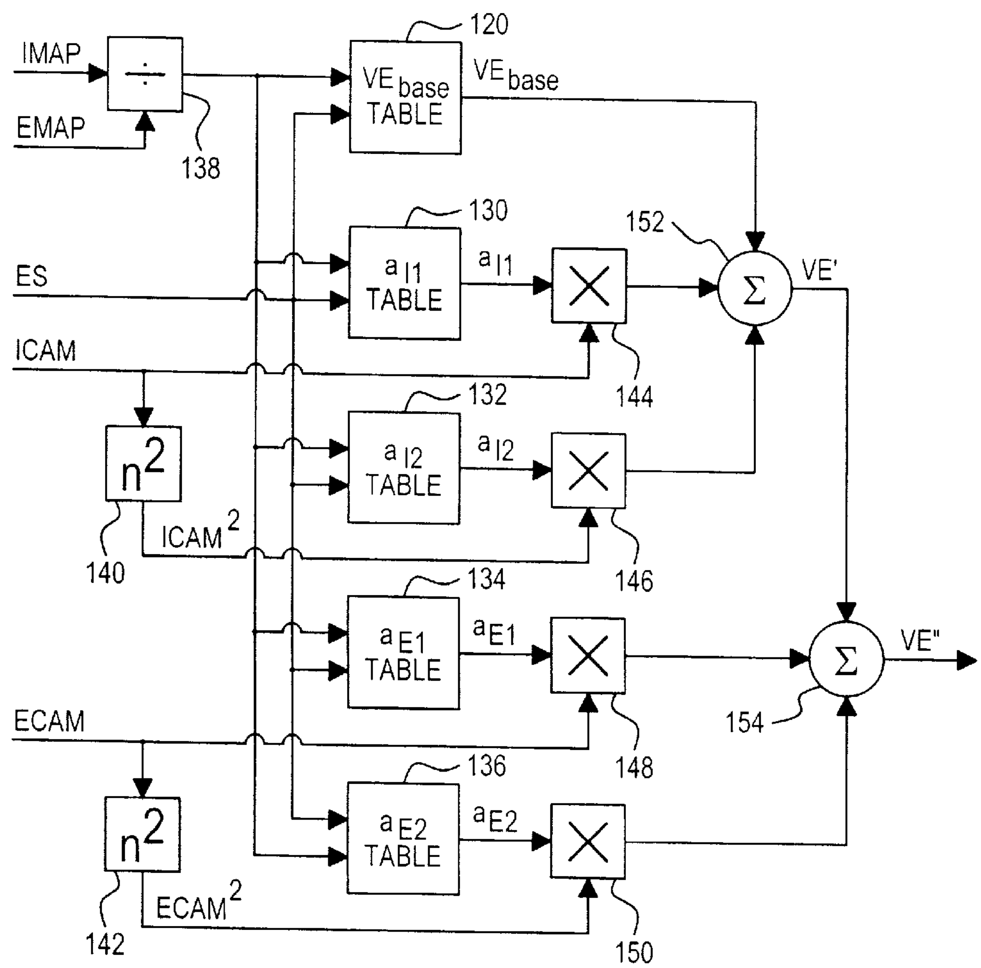
FIG. 3 is a block diagram detailing a portion of the block diagram of FIG. 2.

A more detailed illustration of the VE" determination is depicted in the block diagram of FIG. 3, where separate look-up tables 130, 132, 134 and 136 are provided for storing empirically determined values of the coefficients $a_{11}$, $a_{12}$, $a_{E1}$ and $a_{E2}$. These four tables, along with VEbase table 120, define the total stored data requirement for determining VE", an estimate of the volumetric efficiency that is accurately compensated for any combination of intake and exhaust cam phase angles ICAM and ECAM. Each of the tables 120, 132, 134 and 136 receive engine speed ES and the pressure ratio PR as inputs, with block 138 forming the pressure ratio PR based on intake and exhaust manifold pressure values IMAP and EMAP. In certain implementations, it may be acceptable to use simply IMAP instead of PR, since EMAP is relatively constant, and PR varies predominantly due to variations in IMAP. The $n^2$ blocks 140 and 142 respectively provide the $ICAM^2$ and $ECAM^2$ terms corresponding to $x^2$ in equation (3), and multiplier blocks 144, 146, 148, 150 and summation blocks 152, 154 combine VEbase, ICAM, $ICAM^2$, ECAM, $ECAM^2$ and the coefficients $a_{11}$, $a_{12}$, $a_{E1}$ and $a_{E2}$ as required. Finally, it may be useful in certain applications to include an additional table (not shown) for scaling VE" based on particular combinations of ICAM and ECAM to compensate for various anomalies observed during the calibration process.

As indicated, the small number of look-up tables required according to the above-described method translates into corresponding reductions in the ECM memory requirements and the associated table calibration effort. The 3- table values may be calibrated by dynamometer mapping for several different intake and exhaust phase angles, as will be well known to those skilled in the art. Additionally, the calibration effort may be significantly simplified by using an off-line second (or higher) order interpolation technique (such as an Lagrange interpolation) to derive table data intermediate to the calibrated data.

In summary, the present invention provides a very practical methodology for estimating the volumetric efficiency of an internal combustion engine having dual independent cam phase adjustment. While described in reference to the illustrated embodiment, it is expected that various modifications in addition to those mentioned above will occur to those skilled in the art. For example, exhaust cam phase compensation may be performed prior to intake cam phase compensation, although the illustrated methodology is preferred. Thus, it will be understood that methods incorporating these and other modifications may fall within the scope of this invention, which is defined by the appended claims.

What is claimed is:

1. A method of estimating a volumetric efficiency of an internal combustion engine having a combustion chamber and first and second valves operated by respective first and second cams for controlling a flow of gases through said combustion chamber, said first and second cams having phase angles that are independently controlled relative to nominal phase angles, the method comprising the steps of:

retrieving an empirically determined estimate of a base value of the volumetric efficiency which occurs when the phase angles of said first and second cams are controlled to said nominal phase angles;

compensating the retrieved estimate for changes in volumetric efficiency due to deviation of the phase angle of said first cam from the nominal phase angle to provide an intermediate estimate of the volumetric efficiency; and thereafter compensating said intermediate estimate for changes in volumetric efficiency due to deviation of the phase angle of said second cam from the nominal phase angle to provide an estimate of the volumetric efficiency that is compensated for the phase angles of said first and second cams.

2. The method of claim 1, including the steps of:

approximating said changes in volumetric efficiency due to deviation of the phase angle of said first cam from the nominal phase angle as a first non-linear expression based on the phase angle of said first cam and having a base coefficient representing an initial condition of said volumetric efficiency;

setting the base coefficient of said first non-linear expression in accordance with the retrieved estimate to form said intermediate estimate;

approximating said changes in volumetric efficiency due to deviation of the phase angle of said second cam from the nominal phase angle as a second non-linear expression based on the phase angle of said second cam and having a base coefficient representing an initial condition of said volumetric efficiency; and setting the base coefficient of said second non-linear expression in accordance with said intermediate estimate to form said estimate of the volumetric efficiency.

3. The method of claim 2, wherein said first and second non-linear expressions include further coefficients in addition to said base coefficients, and the method includes the step of:

retrieving previously determined estimates of said further coefficients based on determined engine operating parameters.

4. The method of claim 1, wherein said first valve controls an intake of gases into said combustion chamber, and said second valve controls an exhaust of gases out of said combustion chamber.

5. A method of estimating a volumetric efficiency of an internal combustion engine having a combustion chamber and first and second valves operated by respective first and second cams for controlling a flow of air through said combustion chamber, said first and second cams having phase angles that are independently controlled relative to nominal phase angles, the method comprising the steps of:

determining an initial estimate of the volumetric efficiency based on determined engine operating parameters;

approximating a change in volumetric efficiency due to deviation of the phase angle of said first cam from the nominal phase angle as a first non-linear expression by which said initial estimate is compensated as a function of the phase angle of said first cam to provide an intermediate estimate of the volumetric efficiency; and approximating a change in volumetric efficiency due to deviation of the phase angle of said second cam from the nominal phase angle as a second non-linear expression by which said intermediate estimate is compensated as a function of the phase angle of said second cam to provide an estimate of the volumetric efficiency that is compensated for the phase angles of said first and second cams.

6. The method of claim 5, wherein said first and second non-linear expressions include coefficients associated with the phase angles of said first and second cams, respectively, and the method includes the step of:

estimating values of said coefficients based on determined engine operating parameters.

7. The method of claim 5, wherein said first valve controls an intake of gases into said combustion chamber, and said second valve controls an exhaust of gases out of said combustion chamber.

* * * * *